(12) United States Patent
Choi (10) Patent No.: US 10,349,738 B1
(45) Date of Patent: Jul. 16, 2019

(54) FOLDING TABLE AND MANUFACTURING METHOD THEREOF

(71) Applicant: Inno-Sports Co., Ltd, Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 0 days.

(21) Appl. No.: 15/959,262

(22) Filed: Apr. 22, 2018

(30) Foreign Application Priority Data

Jan. 2, 2018 (CN) .......................... 2018 1 0001318

(51) Int. Cl.
*A47B 13/08* (2006.01)
*A47B 3/00* (2006.01)
*B29C 49/42* (2006.01)
*A47B 13/00* (2006.01)

(52) U.S. Cl.
CPC .............. *A47B 13/08* (2013.01); *A47B 3/002* (2013.01); *A47B 13/003* (2013.01); *B29C 49/4252* (2013.01); *A47B 2200/0001* (2013.01); *A47B 2200/0035* (2013.01)

(58) Field of Classification Search
USPC ................... 108/157.15, 159.12, 118, 157.1
See application file for complete search history.

(56) References Cited

U.S. PATENT DOCUMENTS

| | | | | | |
|---|---|---|---|---|---|
| 3,106,295 A | * | 10/1963 | Berlin | ....................... | A47B 3/12 108/118 |
| 3,106,296 A | * | 10/1963 | Walsh | ....................... | A47B 3/12 108/118 |
| 3,215,097 A | * | 11/1965 | Bedol | ....................... | A47B 3/12 108/118 |
| 3,366,079 A | * | 1/1968 | Koransky | ................. | A47B 3/12 108/118 |
| 3,797,695 A | * | 3/1974 | Law | .......................... | A47C 9/10 108/118 |
| 4,105,271 A | * | 8/1978 | Sebel | ...................... | A47B 41/02 108/124 |
| 4,315,467 A | * | 2/1982 | Vanderminden | .......... | A47B 3/12 108/157.15 |
| 4,686,910 A | * | 8/1987 | Skjerseth | .................. | A47B 3/02 108/118 |
| 4,823,709 A | * | 4/1989 | Tesney | .................. | A47B 13/023 108/157.15 |
| 4,941,413 A | * | 7/1990 | Vanderminden | .......... | A47B 3/12 108/156 |
| 6,006,679 A | * | 12/1999 | Lin | .......................... | A47B 3/02 108/157.15 |
| D511,259 S | * | 11/2005 | Winter | ...................... | D6/708.16 |
| 6,974,185 B2 | * | 12/2005 | Hsieh | ....................... | A47C 3/36 108/117 |

(Continued)

*Primary Examiner* — Jose V Chen
(74) *Attorney, Agent, or Firm* — Gokalp Bayramoglu (57) ABSTRACT

A folding table and a manufacturing method of the folding table. The folding table includes a tabletop and a support bracket, the tabletop includes a flat plate and a vertical plate arranged below the peripheral edge of the flat plate. The upper part of the vertical plate protrudes towards the peripheral side of the flat plate to form the clamping part which is clamped with the support bracket. The manufacturing method includes producing a hollow part through a blow molding process, the middle portion of the part concaves inwards; cutting the concave inward part to form two tabletops; and clasping the tabletop on the support bracket.

16 Claims, 8 Drawing Sheets

(56) References Cited

U.S. PATENT DOCUMENTS 7,905,185 B2 * 3/2011 Peery ................... A47B 3/0912
                    108/132
2019/0021484 A1 * 1/2019 Leng ...................... A47B 13/08

* cited by examiner

FOLDING TABLE AND MANUFACTURING METHOD THEREOF

CROSS REFERENCE TO RELATED APPLICATIONS

This application is based upon and claims priority to Chinese Patent Application No. 201810001318.X, filed on Jan. 2, 2018, the entire contents of which are incorporated herein by reference.

TECHNICAL FIELD

The invention relates to a folding table and a manufacturing method thereof.

BACKGROUND

In modern people's life, folding furniture such as folding tables are becoming more and more widely used, however, tabletops of folding tables are made of hollow plates, and these hollow plates are connected to support brackets by bolts and the like. Because of problems related to production processes, strength issues, and post-assembly during the production process of these hollow plates, opening molds are very complex, and consumes a large amount of raw materials.

SUMMARY

In order to solve the above technical problems, the invention aims to provide a folding table and a manufacturing method thereof.

The invention is realized by using the following technical schemes:

A folding table, including a tabletop and a support bracket. The tabletop includes a flat plate and vertical plates arranged below the peripheral edge of the flat plate, and the upper part of the vertical plate protrudes towards the peripheral side of the flat plate to form the clamping part which is clamped with the support bracket.

Further, the support bracket includes a polygonal frame and a supportor, the polygonal frame is connected with the clamping part.

Further, the tabletop is wrapped around the periphery of the polygonal frame.

Further, the lower part of the polygonal frame is concaved inwards to form the concave part, and the lower part of the vertical plate is located on the concave part.

Further, the frame below the concave part is provided with a flange below the vertical plate.

Further, the supportor includes mutually intersecting rods, the lowermost rod is connected with the balancing rod.

The invention further discloses another technical feature:

a manufacturing method of the above folding table, which includes the following steps:

S1, producing a hollow part through a blow molding process, the middle portion of the hollow part concaves inwards;

S2, cutting the part of S1 to form two tabletops;

S3, clasping the tabletop on the support bracket.

Further, the frame and the supportor are manufactured before S3, and then the frame and the supportor are assembled to form the support bracket.

The folding table and the manufacturing method thereof have the following beneficial effects: the structure and the manufacturing method of the existing folding table are changed and improved. In previous manufacturing and assembly methods the tabletop and the support bracket are fixed by bolts and the like, therefore the bolts and other securing mechanisms would loosen over time. The present invention uses a clasp, which not only ensures the stability of the overall structure after clasping, but also consumes less raw materials and uses those raw materials in an efficient manner; thereby reduces raw material consumption, increasing energy efficiency, and decreasing the environmental impact of the table.

BRIEF DESCRIPTION OF THE DRAWINGS

In order to explain the technical schemes of the present invention more clearly, the drawings used in the description of the embodiments or the prior art will be simply described below, obviously, the drawings in the following description are merely some embodiments of the present invention, those skilled in the art can also obtain other drawings based on these drawings without any creative work.

DETAILED DESCRIPTION

Figure 1:
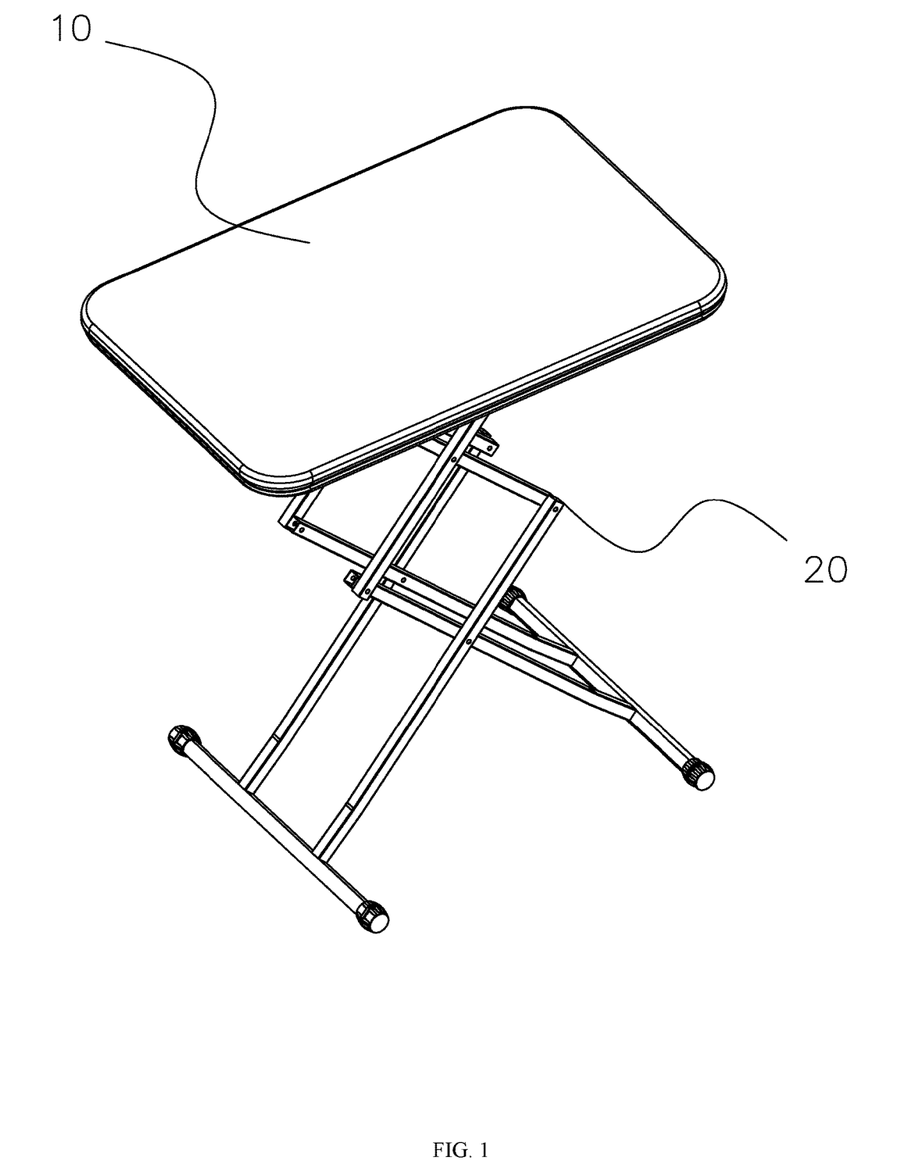
FIG. 1 is a perspective view of the present invention.
Figure 2:
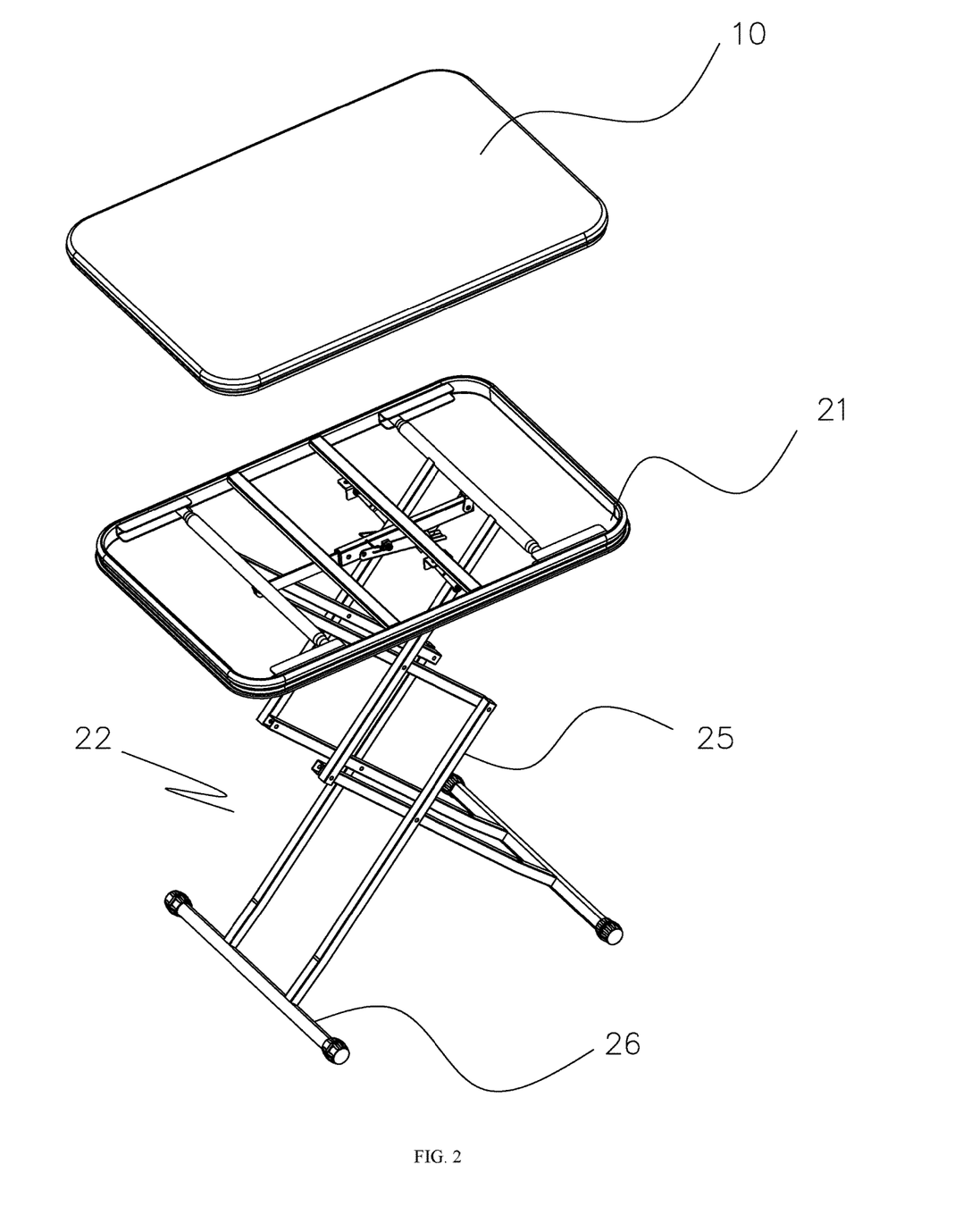
FIG. 2 is an explosive view of the present invention.
Figure 3:
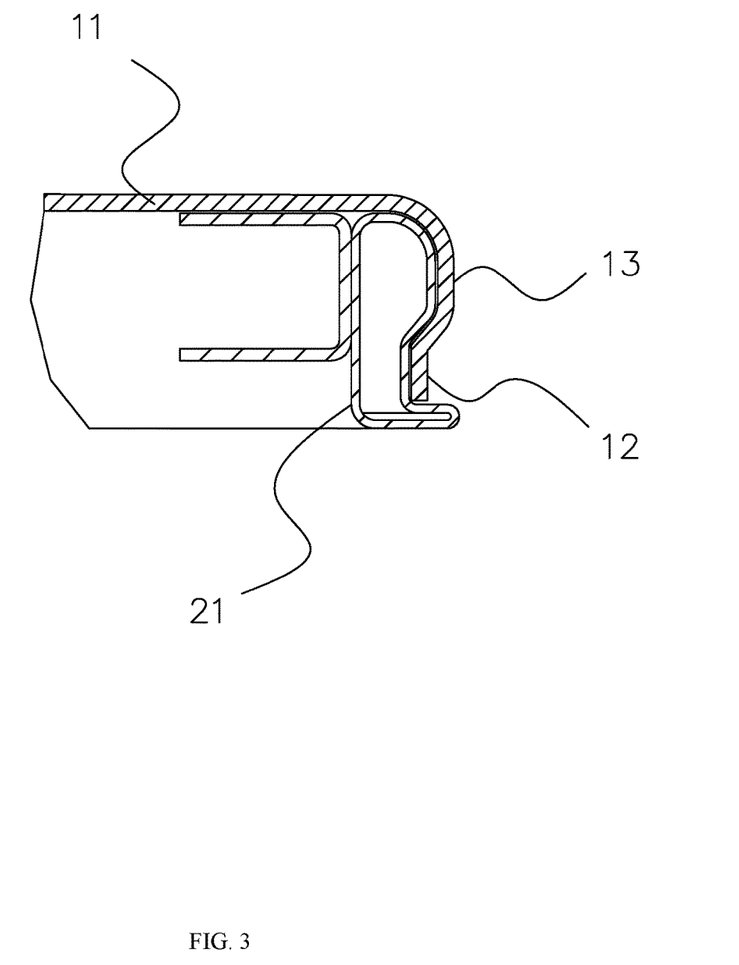
FIG. 3 is a schematic view of the tabletop and frame of the present invention.
Figure 4:
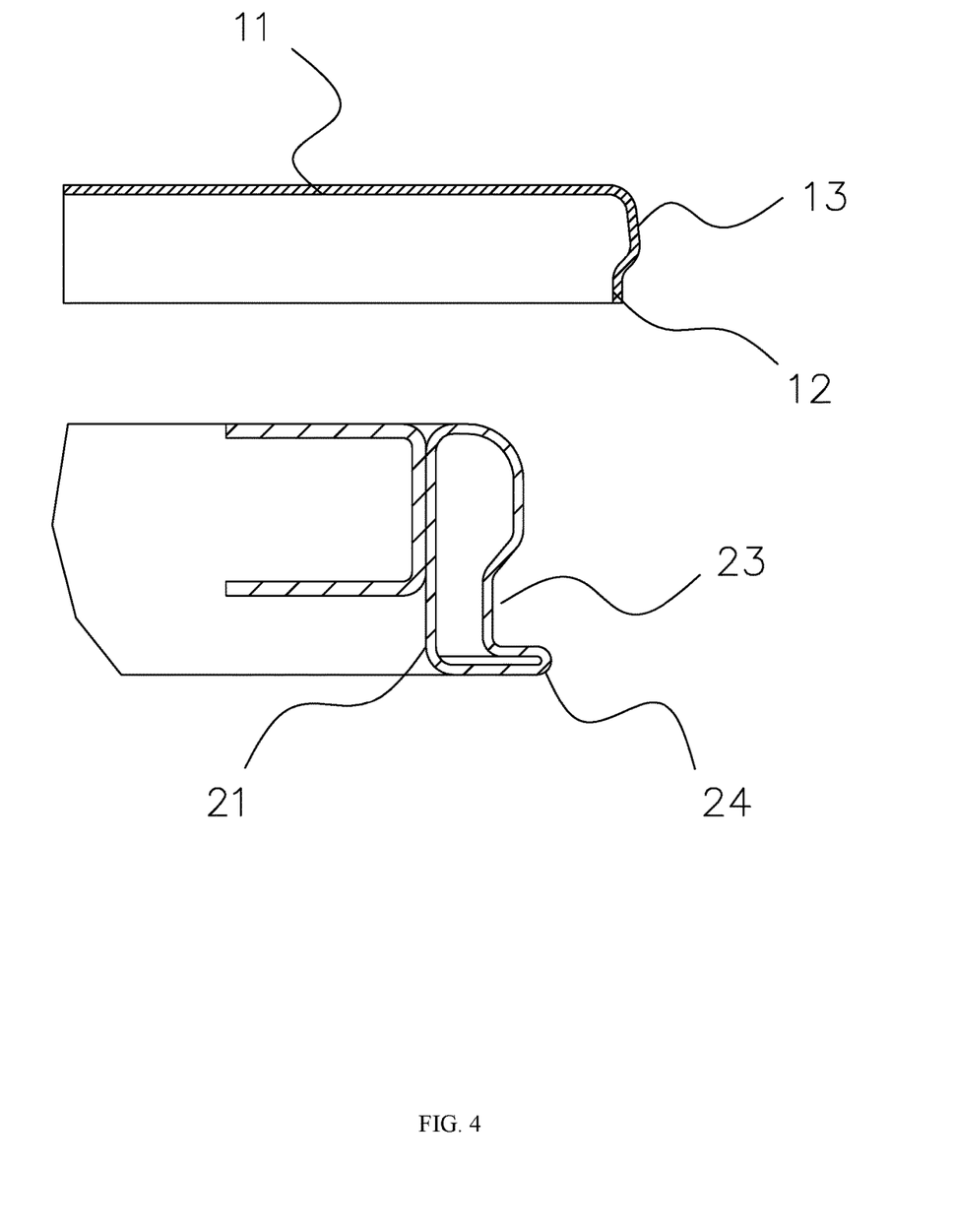
FIG. 4 is an exploded view of the tabletop and frame of the present invention.
Figure 5:
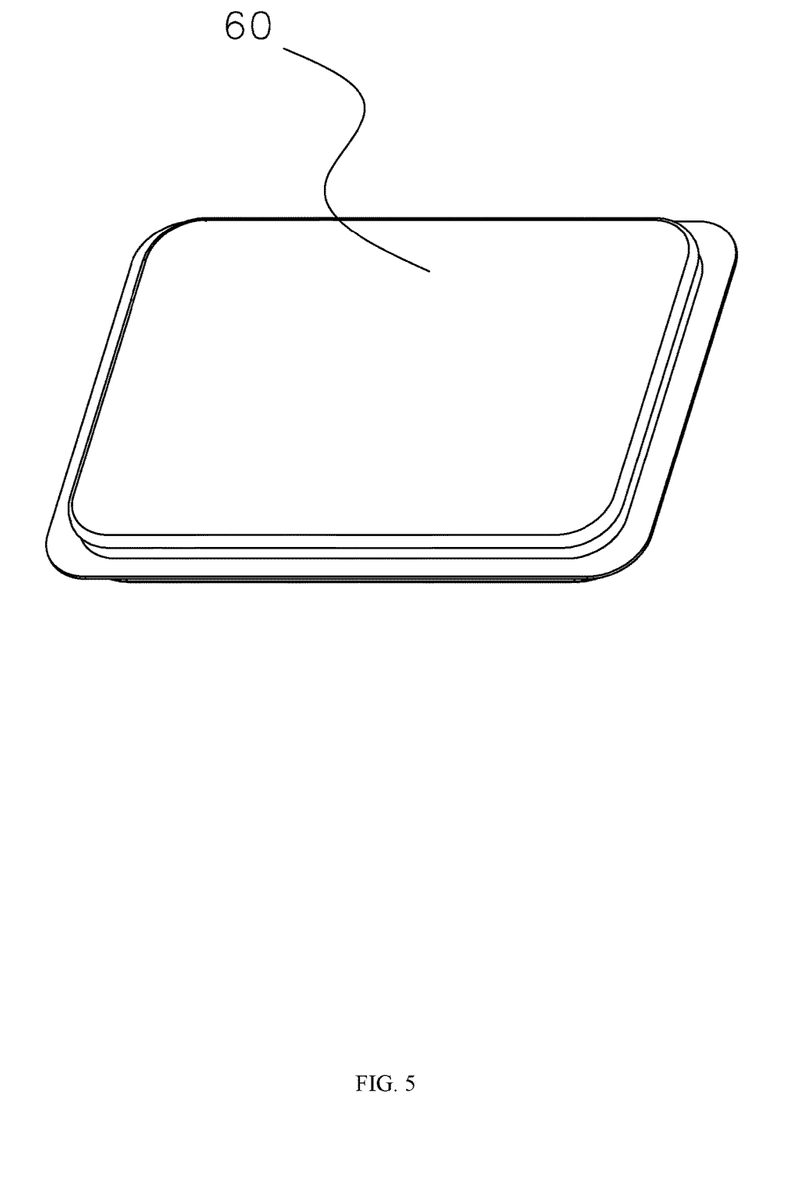
FIG. 5 is a schematic view of the parts of the present invention.
Figure 6:
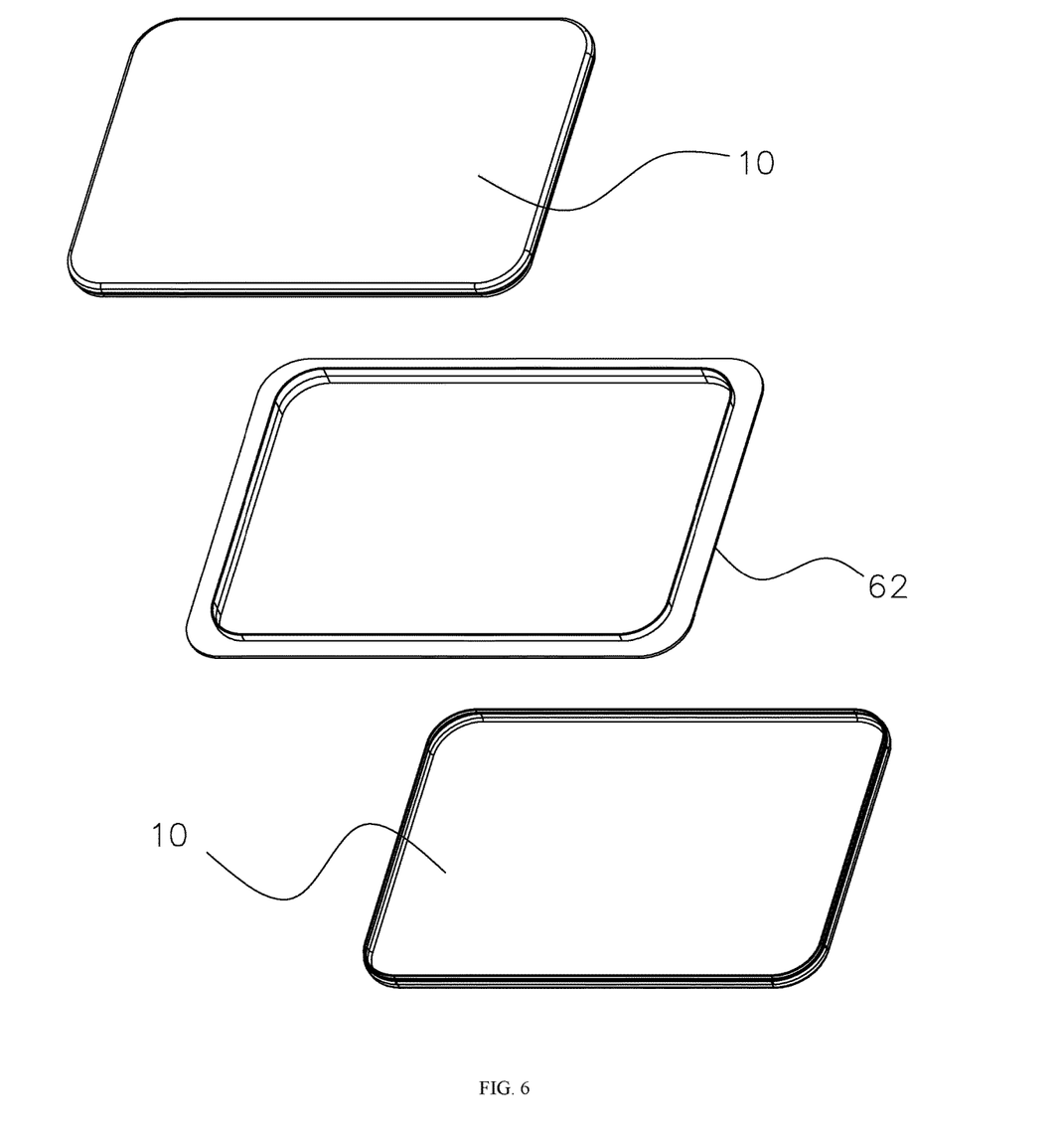
FIG. 6 is a schematic view of the part after cutting of the present invention.
Figure 7:
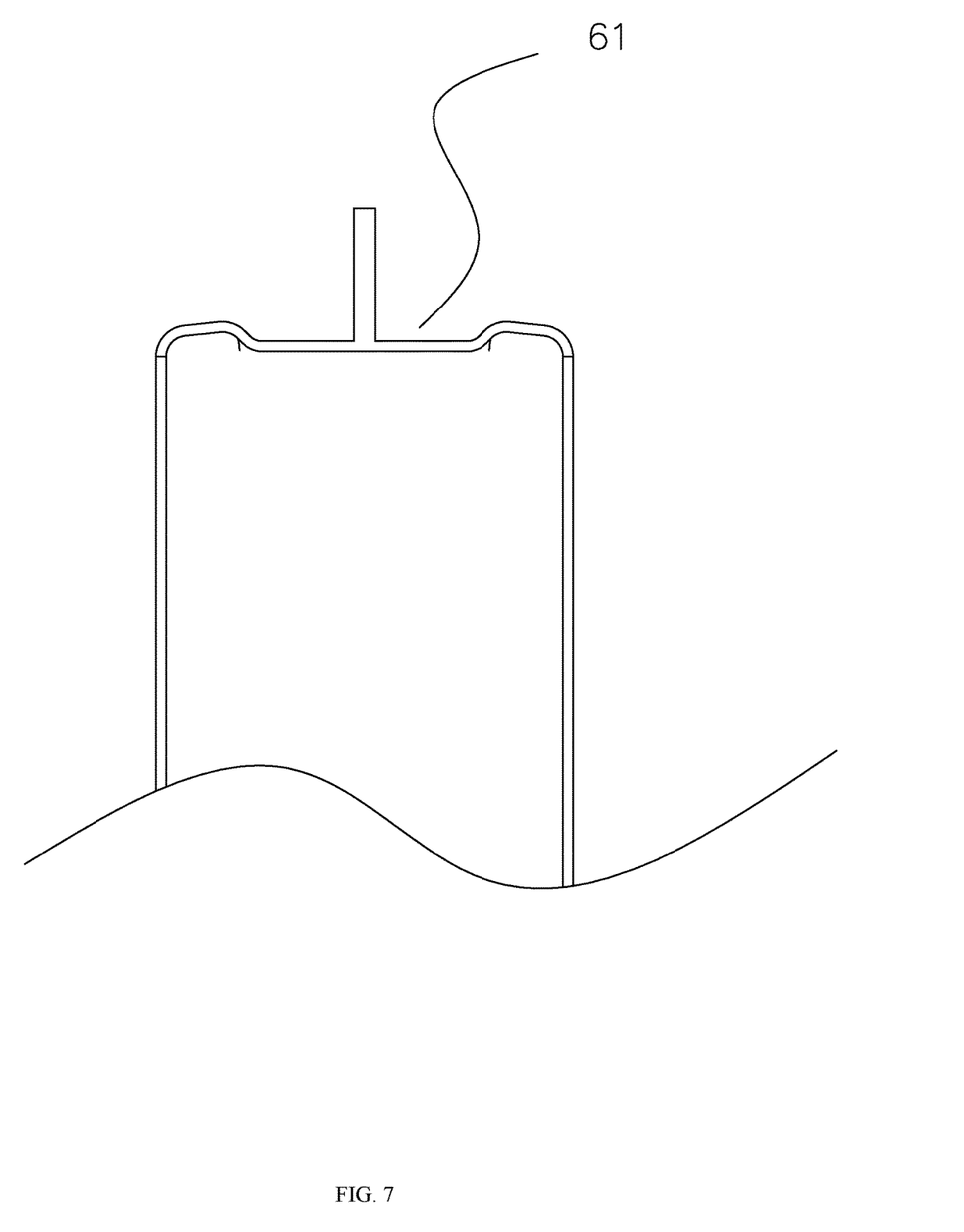
FIG. 7 is a section view of the part of the present invention.
Figure 8:
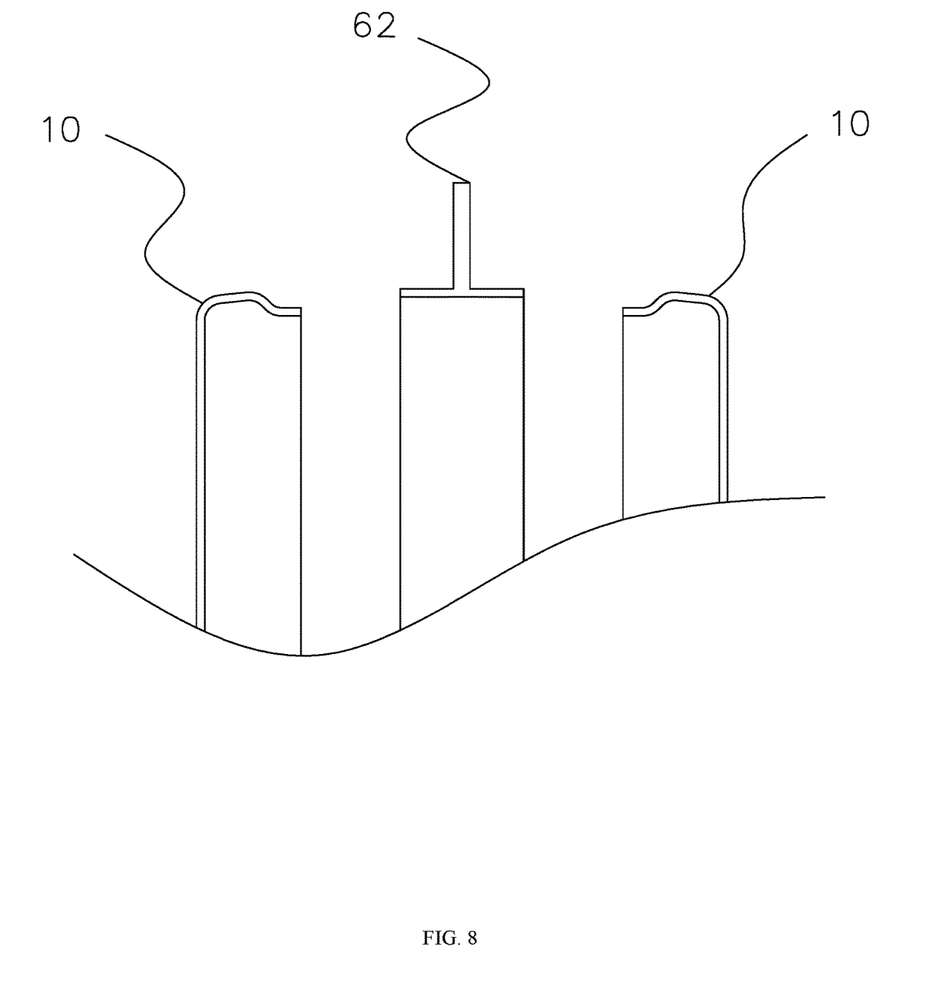
FIG. 8 is a section view of the part after cutting of the present invention.

Hereinafter, the technical schemes in the embodiments of the invention will be described clearly and completely with reference to the drawings of the embodiments in the invention. The described embodiments are only a part of the embodiments of the invention rather than all the embodiments. Based on the embodiments of the invention, all other embodiments obtained by those skilled in the art without creative work belong to the protection scope of the invention.

With reference to the drawings of the specification, a folding table includes the tabletop 10 and the support bracket 20. The tabletop includes the flat plate 11 and the vertical plate 12 arranged below the peripheral edge of the flat plate, and the upper part of the vertical plate protrudes towards the peripheral side of the flat plate to form the clamping part 13, which is clamped with the support bracket. With reference to the drawings of the specification, an illustrative example of square panel tabletop is used. In other words, for exemplary purposes, the flat plate is a square plate, and the vertical plate is an extension part below the periphery of the flat plate. Both the flat plate and the vertical plate are formed by integrally blow molding, at the same time, the clamping part is curved part protruding outwards as shown in the drawings.

Specifically, the support bracket includes the polygonal frame 21 and the supportor 22, the polygonal frame is clamped with the clamping part; in an embodiment, the frame is formed by bending pipe fittings; during installation, one side of the clamping part is firstly clasped with one side of the frame, and then the other side of the frame is clasped, and the tabletop and the frame are assembled after being clasped. More specifically, the tabletop is wrapped around the periphery of the frame.

In a preferred embodiment, the lower part of the frame concaves inwards to form the concave part 23, and the lower part of the vertical plate is located on the concave part, thereby forming a double-clamping structure at the clamping portion of the clamping part and the frame. Thus further ensuring the overall structure of the folding table. The frame below the concave part is also provided with a flange 24 below the vertical plate.

When the table is in use, the supportor includes the mutually intersecting rods 25 and the lowermost rods are coupled with the balancing rods 26. The supportor allows the height of the tabletop to adjust.

The invention further discloses another technical feature: a manufacturing method of the above folding table, which includes the following steps:

S1, producing a hollow part 60 through a blow molding process, the middle portion of the part concaves inwards;

S2, cutting the part of S1 to form two tabletops;

S3, clasping the tabletop on the support bracket.

The frame and the supportor are manufactured before S3 and then the frame and the supportor are assembled to form the support bracket.

With reference to the drawings of the specification, when producing a hollow part by blow molding, the entire part is blow molded as a block, the middle portion in the height direction of the block is concaved inwards to form the concave part 61, and the concave part is the vertical plate as describe above. The middle portion of the concave part has process waste 62, two tabletops as described above are formed by cutting upper portion and lower portion of the process waste. Compared with existing inefficient processes, the blow molding in the invention forms two tabletops in one blow mold. Existing methods can only form one tabletop in one blow mold. Therefore existing methods require various process supports to guarantee the strength of the tabletop and therefore the process and mold opening are more difficult. The invention method simplifies the process because only two cuts are needed whereas existing methods require multiple processes in the removal of process waste The above disclosure is merely preferred embodiments of the present invention, and certainly not to limit the scope of the present invention. Therefore, equivalent changes made according to the claims of the present invention shall still belong to the scope of the present invention.

What is claimed is:

1. A folding table, comprising:
   a tabletop, and
   a support bracket;
   wherein
   the tabletop comprises a flat plate and a plurality of vertical plates arranged below a plurality of peripheral edges of the flat plate; and
   an upper part of each of the plurality of vertical plates protrudes towards a peripheral side of the flat plate to form a clamping part, the clamping part is clamped with the support bracket; wherein a first lower part of a polygonal frame concaves inwards to form a concave part; and a lower part of each of the plurality of vertical plates is located on the concave part.

2. The folding table according to claim 1, wherein the support bracket comprises the polygonal frame and a supportor, and the polygonal frame is clamped with the clamping part.

3. The folding table according to claim 2, wherein the supportor comprises a plurality of mutually intersecting rods, a plurality of lowermost rods are coupled with a plurality of balancing rods.

4. The folding table according to claim 2, wherein the tabletop is wrapped around a periphery of the polygonal frame.

5. The folding table according to claim 4, wherein the supportor comprises a plurality of mutually intersecting rods, a plurality of lowermost rods are coupled with a plurality of balancing rods.

6. The folding table according to claim 1, wherein a second lower part of the polygonal frame below the concave part is provided with a flange, the flange is below each of the plurality of vertical plates.

7. The folding table according to claim 6, wherein the support bracket comprises the polygonal frame and a supportor, and the polygonal frame is clamped with the clamping part and the supportor comprises a plurality of mutually intersecting rods, a plurality of lowermost rods are coupled with a plurality of balancing rods.

8. A manufacturing method of the folding table according to claim 1, comprising the following steps:
   S1, producing a hollow part through a blow molding process, a middle portion of the hollow part concaves inwards;
   S2, cutting the hollow part of S1 to form two tabletops;
   S3, clasping the two tabletops on a support bracket.

9. The manufacturing method of the folding table according to claim 8, wherein
   a frame and a supportor are manufactured before S3; and then the frame and the supportor are assembled to form a support bracket.

10. The manufacturing method of the folding table according to claim 8, wherein
   the support bracket comprises a polygonal frame and a supportor, and the polygonal frame is clamped with the clamping part.

11. The manufacturing method of the folding table according to claim 10, wherein
   a frame and a supportor are manufactured before S3; and then the frame and the supportor are assembled to form a support bracket.

12. The manufacturing method of the folding table according to claim 8, wherein
   the tabletop is wrapped around a periphery of the polygonal frame.

13. The manufacturing method of the folding table according to claim 12, wherein
   a frame and a supportor are manufactured before S3; and then the frame and the supportor are assembled to form a support bracket.

14. The manufacturing method of the folding table according to claim 8, wherein
   a first lower part of the polygonal frame concaves inwards to form a concave part; and a lower part of each of the plurality of vertical plates is located on the concave part.

15. The manufacturing method of the folding table according to claim 8, wherein
   a second lower part of the polygonal frame below the concave part is provided with a flange, the flange is below each of the plurality of vertical plates.

16. The manufacturing method of the folding table according to claim 8, wherein the supportor comprises a plurality of mutually intersecting rods, a plurality of lowermost rods are coupled with a plurality of balancing rods.

\* \* \* \* \*